United States Patent [19]

Howard et al.

[11] Patent Number: 4,608,322
[45] Date of Patent: Aug. 26, 1986

[54] NONAQUEOUS ELECTROCHEMICAL CELL

[75] Inventors: William G. Howard, St. Paul; David R. Berberick, Maple Grove, both of Minn.

[73] Assignee: Medtronic, Inc., Minneapolis, Minn.

[21] Appl. No.: 656,061

[22] Filed: Sep. 28, 1984

Related U.S. Application Data

[63] Continuation-in-part of Ser. No. 537,308, Sep. 29, 1983, abandoned.

[51] Int. Cl.$^4$ .............................................. H01M 4/36
[52] U.S. Cl. .................................. 429/105; 429/196; 429/199
[58] Field of Search ............... 429/101, 105, 194, 196, 429/191, 199, 212

[56] References Cited

U.S. PATENT DOCUMENTS

| | | | |
|---|---|---|---|
| 4,278,741 | 7/1981 | Kalnoki-kis | 429/196 X |
| 4,296,185 | 10/1981 | Catanzarite | 429/194 X |
| 4,402,995 | 9/1983 | Fleischer | 429/212 X |

*Primary Examiner*—Charles F. LeFevour
*Attorney, Agent, or Firm*—Grady J. Frenchick; Joseph F. Breimayer; John L. Rooney

[57] ABSTRACT

A nonaqueous cell comprising an active metal anode, such as a lithium, sodium, potassium, calcium or alloys, a liquid cathode-electrolyte comprising a solute dissolved in a solvent which, in a preferred aspect, is an oxyhalide of an element of Group V or Group VI of the Periodic Table and wherein the surface of the anode contacting the cathode-electrolyte is coated with a polymeric film having ether linkages. In a preferred practice of the present invention, the anode is coated with polyethersulfone.

23 Claims, No Drawings

NONAQUEOUS ELECTROCHEMICAL CELL

This application is a continuation-in-part of application Ser. No. 537,308 filed Sept. 29, 1983, now abandoned.

FIELD OF THE INVENTION

The invention relates to nonaqueous electrochemical cells employing an active metal anode in conjunction with liquid cathode-electrolytes wherein the active metal anode is coated with a film.

BACKGROUND OF THE INVENTION

The development of high energy battery systems requires, among other things, the compatibility of an electrolyte possessing desirable electrochemical properties with highly reactive anode materials such as lithium or the like. The use of aqueous electrolytes is precluded in these systems since the anode materials are sufficiently active to react with water chemically. It has, therefore, been necessary, in order to realize the high energy density obtainable through use of these highly reactive anodes, to turn to the investigation of nonaqueous electrolyte systems.

The term "nonaqueous electrolyte" as used herein refers to an electrolyte which is composed of a solute, such as, for example, a metal salt or a complex salt of Group I-A, Group II-A or Group III elements of the Periodic Table, dissolved in an appropriate nonaqueous solvent. The term "Periodic Table" as used herein refers to the Periodic Table of Elements.

To one of ordinary skill in the art to which this invention relates, selection of a solute is relatively straightforward. However, the selection of a suitable solvent has been troublesome. The ideal battery electrolyte should comprise a solvent-solute pair having a long liquid range, high ionic conductivity and suitable stability. A long liquid range, i.e., high boiling point and low freezing point, is essential if the battery is to operate within a wide range of temperatures. High ionic conductivity is necessary if the battery is to have high rate capability. Stability is necessary with the electrode materials, the materials of cell construction and the products of the cell reaction to provide a long shelf life and a long operating life.

It has been disclosed in the literature that certain materials are capable of acting both as electrolyte carriers, i.e., as solvent for the electrolyte salt, and as the active cathode for an nonaqueous eletrochemical cell. U.S. Pat. Nos. 3,567,515 and 3,578,500 each disclose that liquid sulfur dioxide or solutions of sulfur dioxide and a co-solvent will perform this dual function in nonaqueous electrochemical cells. Other cathode-electrolyte systems are disclosed in U.S. Pat. Nos. 4,328,289 issued May 4, 1982 to Zupancic et al, 4,264,687 issed Apr. 28, 1981 to Dey et al, 4,012,564 issued Mar. 15, 1977 to Auborn, 3,998,657 issued to Auborn et al on Dec. 21, 1976, and 3,926,669 issued to Auborn on Dec. 16, 1975.

U.S. Pat. No. 4,400,453 to G. E. Blomgren et al, issued Aug. 23, 1983, assigned to the Union Carbide Corporation, discloses a nonaqueous electrochemical cell comprising an anode, a cathode current collector and a cathode-electrolyte, the cathode-electrolyte comprising a solution of an ionically conductive solute dissolved in an active cathode depolarizer wherein the active cathode depolarizer consists of a liquid oxyhalide of an element of Group V or Group VI of the Periodic Table. Oxyhalides can be used effectively as a component part of a cathode-electrolyte in conjunction with an active metal anode such as lithium to produce a good high energy density cell. A drawback of oxyhalide cathode-electrolytes has been observed if the cell is stored for a prolonged period of about three days or longer. Passivation of the anode or drop in the cell voltage at the beginning of discharge has been observed in such stored cells.

One of the primary objects of this invention is to substantially reduce the passivation of the active metal anode in oxyhalide cathode-electrolyte cells.

One approach to the problem of anode passivation is described in U.S. Pat. No. 3,993,501 issued Nov. 23, 1976 to Kalnoki-Kis and assigned to Union Carbide Corporation. The '501 patent describes the use of a vinyl polymer film on the surface of the anode where such anode is in contact with liquid cathode-electrolyte. U.S. Pat. No. 4,170,693 issued Oct. 9, 1979 to Catanzarite discloses the use of cyanoacrylate organic compounds coated on the active metal anode. While the Kalnoki-Kis and Cantanzarite approaches to cell passivation appear to be workable, particularly the Cantanzarite approach suffers the drawback of permitting substantial cell self-discharge during storage. Self-discharge and cell passivation are particularly bothersome in such high performance, remote access applications as power supplies for cardiac pacemakers. Thus, the present invention is intended to substantially reduce cell passivation and simultaneously to mimimize self-discharge, particularly as they occur in liquid cathode-electrolyte cells. Furthermore, cell reliability and safety are enhanced by the practice of the instant invention because the anode coating herein described appears to be more resistant to degradation or dissolution than other materials disclosed in the art.

SUMMARY OF THE INVENTION

Briefly, in one aspect, this invention provides an improved high energy density nonaqueous cell comprising an active metal anode, a cathode current collector and an ionically conductive liquid cathode-electrolyte solution wherein the surface of the active metal anode that is in contact with the electrolyte has thereon a thin layer or coat of adherent polymer film having ether linkages, i.e., of the representative structure

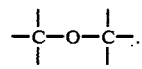

A particularly preferred class of ether-linkage-containing polymers is polyethersulfone. The greater the number of ether linkages in a given coating or film, the more likely reduction in self discharge will be achieved. In some instances, cell passivation also will be reduced. It is also within the scope of this invention to have the polyether coating, e.g., polyethersulfone, serve the dual function of substantially preventing passivation of the anode while serving as the sole separator of the cell or permitting the use of a thinner separator than would be normally required for cell use.

DETAILED DESCRIPTION OF THE INVENTION

The present invention, in the broadest interpretation, contemplates the utilization of a polyether coating on the active metal anode of the electrochemical cells described herein. This invention also contemplates the utilization of mixtures or blends of polyethers, as well as copolymers which contain ether linkages. Other functionalities may be present in the anode polymer coating employed as long as there are sufficient ether linkages or functionalities in the polymer to provide the advantageous properties described herein.

It should be noted that a particular polyether coating may not provide an enhancement, reduction or improvement in all cell performance aspects such as passivation, reduction of cell impedance or reduction of self-discharge. However, as more clearly set forth in the examples, particular polyethers do provide improvements in one or more of these properties (if not all of them) relative to uncoated anode cells and relative to anodes coated with prior art materials. Thus, based upon the teachings of this invention, a selection of a particular polyether anode coating may be made to substantially mitigate a problem, e.g., self discharge, without concern about some other problem, e.g., passivation.

Lastly, the precise chemical events which occur after an anode coated with a material of the invention is placed under continuous load are largely unknown. The details of the chemical interactions between the cell constituents herein described and the anode coatings need not be known to achieve the advantageous properties of this invention.

The cathode-electrolyte solvents known to be useful in these batteries, in addition to thionyl chloride, include sulfur dioxide and other fluid oxyhalides, non-metallic oxides, halogens, non-metallic halides and mixtures thereof such as phosphorus oxychloride ($POCl_3$), selenium chloride ($SeCl_2$), sulphur trioxide ($SO_3$), vanadium oxytrichloride ($VOCl_3$), sulphuric oxychloride ($SO_2Cl_2$), nitrile chloride ($NO_2Cl$), nitrosyl chloride ($NOCl$), nitrogen dioxide ($NO_2$), sulphur monochloride ($S_2Cl_2$), bromine ($Br_2$), chlorine ($Cl_2$) and sulphur monobromide ($S_2Br_2$). Solvents of this type can be used together with thionyl chloride ($SOCl_2$) or separately. Other nonaqueous solvents may be included along with the aforementioned cathodic active materials such as organic solvents including propylene carbonate, acetonitrile, methyl formate, tetrahydrofuran and the like which have been generally used in nonaqueous high energy density lithium and lithium/$SO_2$ cells.

This invention is useful in any of the above described liquid cathode-electrolyte systems. However, in a preferred practice, the cathode-electrolyte solution consists essentially of a solute dissolved in a liquid oxyhalide of an element of Group V or Group VI of the Periodic Table. Non-reactive or reactive cosolvents optionally may be employed. In yet a more preferred practice of the invention, the liquid oxyhalide is thionyl chloride.

The preferred oxyhalides of the elements of Group V or Group VI of the Periodic Table are liquid active reducible cathode materials (depolarizers). As used herein, a cathode depolarizer is the cathode reactant and, thus is the material electrochemically reduced at the cathode.

The active reducible electrolyte solvent performs the dual function of acting as solvent for the electrolyte salt and as an active cathode depolarizer of the cell. The term "cathode-electrolyte" is used herein to describe electrolytes containing solvents that can perform this dual function.

Active metal anode, as the term is used herein is intended broadly to mean electrochemically active, consummable metals specifically including, but not limited to, the alkali metals, or alkaline earth metals and alloys of alkali metals or alkaline earth metals with each other and with other metals. The term "alloys" as used herein is to be broadly understood to mean mixtures, solid solutions or intermetallic compounds. The preferred anode materials are the alkali metals, particularly lithium, sodium and potassium.

The cathode collector is not an active, i.e., reducible, material and functions as a current collector plus electronic conductor to the cathode terminal of a cell. In other words, the cathode collector is a situs for the electrochemical reduction reaction of the active cathode material and the electronic conductor to the cathode terminal of a cell.

Any compatible solid which is substantially electronically conductive could be utilized as a cathode collector in the cells of the present invention. It is desirable to have as much surface contact as possible between the cathode-electrolyte and the cathode current collector. It is, therefore, preferred to employ a porous collector since it will provide a high surface area interface with the liquid cathode electrolyte. Preferably, however, a pressed powder collector should be at least partially of carbonaceous or other high surface area material. A particularly preferred cathode current collector is fabricated from porous carbon. Carbon cathode current collectors of the preferred type may be formed by pressing particulate carbon such as carbon black or acetylene black or graphite to a desired form. To impart a cohesive characteristic to such particulate pressed bodies, a suitable binder material may be added to the particulate. Suitable binder materials for this purpose include polytetrafluoroethylene, fluorinated ethylene propylene, polyethylene tetrafluoroethylene, polychlorotrifluoroethylene, polyethylene chlorotrifluoroethylene and the like.

Polytetrafluoroethylene is the preferred binder for carbon current collectors. The binder, when used, may be added in an amount between about two percent and about sixty percent by weight of the formed cathode current collector.

Although porous carbon or graphite such as Shawinigan carbon black (Shawinigan Products Co., Englewood Cliffs, N.J.) are generally the most preferred inert cathode current collector materials, other inert conductive materials such as nickel and stainless steel (e.g., a screen or foil) have been used as cathode current collectors in the types of cells with which this invention is concerned.

A liquid active reducible cathode material (depolarizer) can either be employed by itself in an electrochemical device (e.g., galvanic cell) mixed with a conductive solute which is a non-reactive material but which improves cathode conductivity, or mixed with both a conductive solute and a reactive or non-reactive cosolvent material. A reactive cosolvent material is one that is electrochemically active and, therefore, functions as an active cathode material. A non-reactive cosolvent material is one that is electrochemically inactive and, therefore, does not function as an active cathode material.

Solutes which may be employed in the present invention are simple or double salts which produce an ionically conductive solution when dissolved in the desired solvent. Preferred solutes are complexes of inorganic or organic Lewis acids and inorganic ionizable salts. The only requirements for utility are that the salt, whether simple or complex, be compatible with the solvent being employed and that it yield a solution which is sufficiently conductive. According to the Lewis or electronic concept of acids and bases, many substances which contain no active hydrogen can act as acids or acceptors of electrons. The basic concept is set forth in the chemical literature and will be well known to one of ordinary skill in the present art.

Typical Lewis acids suitable for use in the present invention include aluminum fluoride, aluminum bromide, aluminum chloride, antimony pentachloride, zirconium tetrachloride, phosphorous pentachloride, boron fluoride, boron chloride, gallium chloride, niobium chloride and boron bromide.

Ionizable salts useful in combination with the Lewis acids include lithium fluoride, lithium chloride, lithium bromide, lithium sulfide, lithium oxide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

An early description of the use of a single component of the cell as both an electrolyte carrier and active cathode depolarizer is contained in the Kalnoki-Kis patent cited above. Prior to that time, it was generally believed that the two functions were necessarily independent and could not be served by the same material because for an electrolyte carrier to function in a cell, it is necessary that it contact both the anode and the cathode depolarizer so as to form a continuous ionic path therebetween. Since it was generally assumed that the cathode must never directly contact the anode, it was concluded that the two functions were mutually exclusive. The discovery that certain active cathode materials, such as the liquid oxyhalides, did not appreciably react with active anode metals gave rise to the identification of dual-function, cathode-electrolytes.

Although the active reducible liquid oxyhalides materials did inhibit the direct reaction of active metal anode surfaces with cathodes sufficiently to permit them to act as both the cathode material and as the electrolyte carrier for nonaqueous cells, they also caused formation of a surface film on the active metal anode during cell storage (particularly at elevated temperatures) which consisted of a rather heavy layer of crystalline material. While such a layer is desirable to the extent it is adherent and reduces anode activity (thus permitting the use of high energy density anodes), thicker crystalline layers may cause passivation of the anode. Anode passivation results in voltage delay on initial discharge along with high cell impedance values.

The extent of anode passivation can be measured by observing the time required for the closed circuit voltage of the stored cell to reach its intended level after discharge has begun. What has been observed, for example, in lithium-oxyhalide cell systems is that after a load is applied across the terminals of the cell, the cell voltage immediately drops below the intended discharge level, then increases at a rate depending on the extent of lithium passivation and the current density of discharge.

To substantially prevent anode passivation which occurs in the preferred active metal-oxyhalide cathode-electrolyte cell systems during discharge, the surface of the active metal can be coated with a polymer film or coating containing a predominance of ether linkages. Polyether films and especially the preferred polyethersulfone films have the surprising and unexpected combination of properties in that they adhere to anode metal sufficiently to act as a sole cell separator (especially when combined with an inert filler such as glass or ceramic particulates), are substantially stable in the presence of many cell constituents, do not completely dissolve in liquid cathode-electrolytes (particularly the preferred oxyhalides of Groups V and VI), do not decrease cell capacity during storage and discharge, reduce internal cell impedance and, in fact, tend to increase usable cell capacity.

The preferred polyethersulfone materials suitable for coating active metal anodes in accordance with this invention may be represented by the following generic formula for the repeating unit in the polymer:

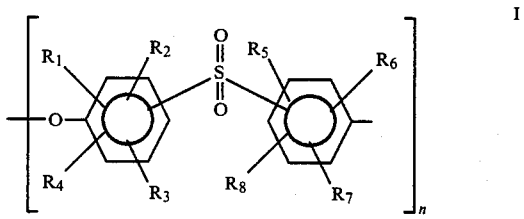

I wherein $R_1$, $R_2$, $R_3$, $R_4$, $R_5$, $R_6$, $R_7$ and $R_8$ (hereafter sometimes "$R_1$-$R_8$") are separately and independently selected from the group consisting of hydrogen and alkyl (i.e., $-C_aH_{2a+1}$, "a" having a value of about 1 to 9). As indicated in the structural formula, "n" having a value in the range of about 10 to about 1,000, preferably about 75 to 250. The precise value of "n" is not critical to the present invention as long as the polyethersulfone thereby represented has sufficient internal integrity to adhere to the working surface of the anode and to provide an ionic pathway between the anode and the cathode-electrolyte. As indicated in I, the sulfone linkage generally may be between any two positions on the aromatic nuclei, $R_1$-$R_8$ being shifted accordingly. Derivatives of the polymer represented by Formula I which do not substantially alter chemical properties are necessarily within its scope.

In an especially preferred practice of the present invention, the polyethersulfone is of the structure:

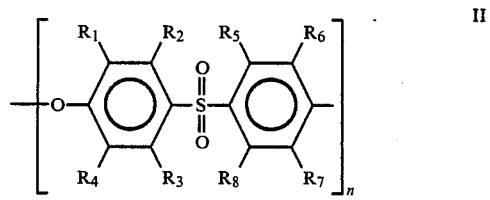

II wherein $R_1$-$R_8$ are selected from the group consisting of hydrogen and alkyl as defined above, and "n" is defined as above.

Polyethersulfones are the subject of an extensive discussion in the 1982-1983 *Modern Plastics Encyclopedia*, pp. 118-119, the teachings of which are incorporated by reference herein. Although not mentioned in the *Modern Plastics* article noted above, copolymers of polyethersulfone and other reactive monomers or blends with other polymers are within the contemplation of the present invention, provided such copolymers are predominantly polyethersulfone. If large amounts of other reactive monomers are employed to produce anode copolymers or non-ether containing polymer mixtures, the unexpected advantages of polyethersulfone are likely to be reduced.

Polyether polymers for use in this invention should be soluble in a solvent which does not significantly attack the active metal anode such as lithium, must not be substantially degraded or decomposed in the presence of either the solvent used for the coating procedure (if a solvent coating procedure is used) or the oxyhalide cathode-electrolyte used in the cell, and must form a thin coating which tenaciously adheres to the working surface of the anode (i.e., that portion of the anode in electrical contact with the cathode-electrolyte) in the presence of the cell electrolyte while not interfering with the useful discharge of the cell. The polyether anode film also may be separately fabricated to a desired thickness and pressed against the anode material with sufficient force so that the coating adheres thereto.

For cell applications, the polyether film formed on the surface of the anode must be ionically permeable, essentially electronically nonconductive and cathode-electrolyte insoluble (or only partially soluble).

In a particularly preferred practice of the instant invention, a polyethersulfone film as in formula II is utilized on an active metal anode surface (e.g., lithium submerged in a liquid oxyhalide electrolyte wherein the oxyhalide is selected from Group V and Group VI of the Periodic Table.

The thickness of the preferred polyethersulfone film can vary between about 0.1 mil (0.0001 inch) and about 10 mils (0.010 inch) and preferably between about 1 mil (0.001 inch) and about 5 mils (0.005 inch). A film thickness below about 0.1 mil would be ineffective in substantially preventing the passivation of the active metal anode, such as lithium in a lithium-oxyhalide system, while a thickness above about 10 mils would undesirably increase the internal resistance of the cell (and decrease cell volume for anode and cathode materials). However, particularly when the polyethersulfone film or coating replaces the separator of the cell, its thickness may exceed 10 mils (0.010 inch).

The polyether film can be applied to the active metal surface by any conventional technique such as spraying, painting or the like with or without a suitable liquid suspending medium. A suitable liquid suspending or solvent medium could be the oxyhalide solvents used in the cell as, for example, thionyl chloride ($SOCl_2$) or sulfuryl chloride ($SO_2Cl_2$). Thus, for example, polyethersulfone polymer can be dissolved in thionyl chloride and then applied to the surface of a metal anode either by immersing the metal anode into the solution or by painting or spraying the solution onto the surface of the metal anode. Upon evaporation of the solvent, a tightly adherent, thin film remains on the metal anode surface.

In another approach, the polyether may be dissolved in volatile solvents, e.g., dimethyl formamide or dimethyl acetamide, which is subsequently evaporated, leaving a film or coating on the anode. This step may be repeated to produce a coating of a desired thickness.

The concentration of the polyether polymer e.g., polyethersulfone, in the solvent can vary widely as long as a film of suitable thickness is deposited on the metal anode as specified above. A suitable concentration of the preferred polyethersulfone polymer has been observed to be between about 2 to 30 weight percent as based on the weight of the solvent. A concentration below about 2 weight percent would probably be insufficient to provide an effective film on the metal anode, such as lithium, while a concentration above 30 weight percent becomes difficult to apply. When a preferred lithium anode is coated with a preferred polyethersulfone polymer (such as that commercially available from the ICI Americas, Inc. under the trade designation "Victrex") the polyethersulfone is preferably dissolved in dimethylformamide.

Cells of the aforementioned type may also employ a suitable separator in addition to the coated anode to prevent the reaction of anode and cathode materials when no electric current flows through the external circuit. Since the cathode material is not spontaneously reactive with the anode material, mechanical separators which only prevent contact between the two electrodes can be used. A wide variety of ceramic and plastic materials having small pore sizes is available for this purpose. Examples of such materials include: alumina, beryllia, magnesia, zirconia, titania, porcelain, porous glass, non-woven porous polytetrafluoroethylene and other fluorinated polymers. A preferred porous separator is the fiberglass cloth which is typically used as filter paper. Such cloth, known as "glass paper" may be obtained from Mead Corp., Speciality Paper Div., South Lee, Mass. 02160.

As already pointed out, the various aforementioned elements of the battery must be placed in operating relationship whereby both the anode and cathode current collector, although maintained in a spaced relationship, are exposed to the cathode-electrolyte. The separator, if used, is placed between the anode and the cathode current collector and is also exposed to the cathode-electrolyte. One versed in the instant art will be familiar with the multitude of possible cell configurations which employ this basic concept.

In addition to substantially preventing metal anode passivation in nonaqueous oxyhalide cells, the polyethersulfone film of this invention appears to provide for a more uniform consumption of the metal anode during discharge and when used as the sole separator of the cells, it will result in a decrease of that portion of the polarization losses of the cell attributed to conventional type separators.

The present invention will be further illustrated by the following Examples which are to be considered illustrative and not limiting.

EXAMPLE I

Several D-shaped specimens of pure lithium foil obtained commercially from the Foote Mineral Co. measuring approximately 3 cm by 2 cm were coated with a 15 percent by weight solution of polyethersulfone polymer (obtained commercially from ICI Americas, Inc.) in dimethylformamide. Each lithium sample was painted with the coating solution, and the solvent was evaporated. This procedure was twice repeated. The thickness of the resulting polyethersulfone film was about 1.5 mils.

EXAMPLE II

Illustrating the reduction in cell passivation obtainable in the practice of the instant invention.

Lithium-thionyl chloride cells were constructed utilizing the anodes prepared in example I and stored for 150 days to 37° C. After this storage period, the delay time of cells having a polyethersulfone coating of the invention and no anode coating was measured. "Delay time" as used in this measurement means the time between placing the cell on discharge at 87.5 milliamperes constant current and the time to achieve a cell voltage of 3 volts. The delay time for the uncoated anode cell was 324 seconds while that of the coated anode was 10 seconds.

EXAMPLE III

Illustrating the reduction in cell self-discharge obtainable by utilization of the instant invention.

Cells as prepared in example I were monitored using microcalorimetry to determine the rate at which they were generating heat. Their heat output is directly proportional to the rate at which the cells are self-discharging. Further, actual internal cell resistance was measured. For lithium-thionyl chloride electrochemical cells having uncoated anodes stored at 120 days at 37° C., the heat output was 45 microwatts and internal cell resistance was 40 ohms. For cells having anodes with polyethersulfone coatings, the heat output was 8 microwatts and internal cell resistance was 20 ohms.

EXAMPLE IV

Pairs of anodes (A and B) with polyether and polyether-based coatings were employed to produce cells as described in the above examples. These cells then were tested for their respective alternating current cell impedances after 6 weeks storage at 37° C., and the time after being placed under a 48 ohm load in which the cells return to a 3.0 volt cutoff. Generally speaking, the shorter this time period the better the respective coating reduced cell passivation. The results of these tests are shown in Table 1.

TABLE 1

| Cell No. | Anode Coating | A.C. Impedance 1000 Hz, ohms | 3.0 V Cut off, sec. |
| --- | --- | --- | --- |
| 1A | uncoated anode | 290 | 36[b] |
| 1B |  | 280 | 70[b] |
| 2A | polyethylene glycol methyl ether | 70.8 | 8.5 |
| 2B |  | 68.7 | 9.5 |
| 3A | polyoxyethylene lauryl ether[a] | 26.1 | 150 |
| 3B |  | 22.6 | 215 |
| 4A | polyetherimide | 28.6 | 1.8 |
| 4B |  | 36.4 | 2.4 |
| 5A | "Vibrathane" polyether urethane prepolymer[d] | 14.7 | 21.0 |
| 5B |  | 15.9 | 21.0 |
| 6A | polyvinyl methyl ether[a] | 20.5 | 41.5 |
| 6B |  | 20.0 | 44.5 |
| 7A | polytetramethylene ethylene oxide[a] | 62.9 | 250 |
| 7B |  | 67.3 | 560 |
| 8A | "Pellethane" polyether urethane[e] | 71.9 | 150 |
| 8B |  | 92.0 | 125 |
| 9A | 50/50 wt % polyethersulfone and polyethylene oxide (m.w. 200,000) | 12.6 | 2.0 |
| 9B |  | 12.3 | 2.8 |
| 10A | 50/50 wt % polyethersulfone and | 13.2 | 1.5 |

TABLE 1-continued

| Cell No. | Anode Coating | A.C. Impedance 1000 Hz, ohms | 3.0 V Cut off, sec. |
| --- | --- | --- | --- |
|  | polyethylene oxide (m.w. 100,000) |  |  |
| 10B |  | 14.1 | 2.1 |
| 11A | 50/50 wt % polyethersulfone and polyethylene oxide (m.w. 600,000) | 14.1 | 2.8 |
| 11B |  | 13.7 | 2.0 |
| 12A | 50/50 wt % polyethersulfone and polyethylene oxide (m.w. 5,000,000)[a] | 19.7 | 3.7 |
| 12B |  | 20.2 | 6.0 |
| 13A | polyethersulfone | 17.8 | 2.0 |
| 13B |  | 17.6 | 2.0 |
| 14A | "Pluronic F68" (copolymer of 80% polyoxyethylene and 20% polyoxypropylene)[c] | 26 | 7.3 |
| 14B |  | 26 | 6.0 |
| 15A | "VYNC" (copolymer of polyvinyl chloride and polyvinylacetate[f] | 29<br>35 | 28<br>41 |

[a]Commercially available from Polysciences, Inc., Worthington, PA.
[b]Times for the uncoated anode cells were to a 1.0 volt recovery. The cell did not recover to 3 volts
[c]BASF-Wyandotte Corp.
[d]Uniroyal Corp.
[e]Upjohn Company
[f]Union Carbide Corporation

EXAMPLE V

The internal impedances of a number of cells having various listed anode coatings were measured after the cells had been maintained for a time period of 30 days at 37° C. The results of these alternating current measurements (which were obtained at 1000 Hz) are displayed in Table 2. The numbers contained in Table 2 are an average of 3 cells prepared utilizing the listed polyether anode coating. For purposes of reference, the measurement obtained from an uncoated anode is listed first.

TABLE 2

| Anode Coating Gel | AC Impedance 1000 Hz ohms |
| --- | --- |
| 1. Uncoated control | 67 |
| 2. Polyethylene glycol methyl ether | 57 |
| 3. Polyvinyl isobutylether | 52 |
| 4. Polytetramethylethylene oxide | 51 |
| 5. Polyetherimide | 30 |
| 6. Polyoxyethylene laural ether | 24 |
| 7. Polyvinyl methyl ether | 18 |
| 8. Polyethersulfone | 16 |
| 9. "Vibrathane" polyether urethane | 16 |
| 10. polyethersulfone + polyethylene oxide (100,000 m.w.); 50/50 wt % | 14 |

EXAMPLE VI

The heat output in microwatts was measured for a number of cells prepared with the anode coatings listed in Table 3. It will be recognized that the higher the level of heat output, the higher internal self-discharge (and thus the shorter shelf life) of the respective cells. The numbers listed are an average of 2 cells which were prepared using the stated anode coatings. The heat outputs were obtained after the cells had been maintained at a temperature of 37° C. for about 30 days.

TABLE 3

| Anode coating | Heat output microwatts |
| --- | --- |
| Control (uncoated) | 37 |
| Polyethersulfone | 6 |
| Polyethylene glycol methyl ether | 12.5 |

TABLE 3-continued

| Anode coating | Heat output microwatts |
| --- | --- |
| Polyethylene oxide (mw = 5 million) | 4 |
| Polyethylene oxide (mw = 100,000) | 17 |
| Polyvinyl methyl ether | 62 |
| Polyvinyl isobutyl ether | 72 |
| Cyanoacrylate | 75 |
| Vinyl chloride/vinyl acetate | 23 |

EXAMPLE VII

Three cells as described above were prepared using case negative construction, the only difference in the cells being the different anode coatings employed. After about 70 days at 37° C., the cells were placed in a calorimeter to measure their heat outputs. The cell without anode coating had a heat output of 37 microwatts. The cell with a polyethersulfone anode coating had a heat output of 19 microwatts and a cell with a cyanoacrylate anode coating had a heat output of 73 microwatts. Alternating current cell impedances were measured for the same three cells and found to be 40 ohms for the uncoated anode, 20 ohms for the polyethersulfone coated anode and 16 ohms for the cyanoacrylate coated anode.

EXAMPLE VIII

Electrochemical cells employing 1.8M $LiAlCl_4$ electrolyte in thionyl chloride with various active metal anodes were prepared. In addition to the lithium anode cells discussed above, anodes were prepared from aluminum, magnesium, calcium and lithium-calcium alloys. Polyether coated cells were prepared from these active metals as listed in Table 4. Heat outputs (after two weeks storage at 37° C.) also were measured as shown in Table 4.

Table 4 indicates the substantial enhancement in performance achieved by the utilization of polyether anode coatings as described in the present invention.

TABLE 4

| Anode Metal | Anode Coating | Heat Output, Microwatts |
| --- | --- | --- |
| lithium | polyethersulfone | 24 |
| lithium | polyethylene oxide (m.w. 600,000) | 16.8 |
| lithium | none | 57 |
| aluminum | polyethersulfone | 11.5 |
| aluminum | polyethylene oxide | 38 |
| aluminum | none | 49 |
| magnesium | polyethersulfone | 38 |
| magnesium | none | 83 |
| calcium | polyethersulfone | 38 |
| calcium | none | 588 |
| 5 a/o calcium-lithium | polyethersulfone | 8 |
| 5 a/o calcium-lithium | none | 40 |

EXAMPLE IX

A number of different combinations of solute/solvent were employed with various polyether coatings on lithium anode cells. These cells then were evaluated for their open circuit voltages, impedances and heat outputs after storage for approximately 11 days at 37° C. The results of these evaluations are shown in attached Table 5.

TABLE 5

| Lithium Anode Coating | Electrolyte Solute/Solvent | OCV, V* | Impedance, ohms* | Heat Output, Microwatts* |
| --- | --- | --- | --- | --- |
| polyethersulfone | 1.8 M $LiAlCl_4$ $SOCl_2$ | 3.67 | 15 | 30 |
| polyethylene oxide (M.W. 600,000) | 1.8 M $LiAlCl_4$ $SOCl_2$ | 3.72 | 630 | 17 |
| none | 1.8 M $LiAlCl_4$ $SOCl_2$ | 3.69 | 60 | 57 |
| polyethersulfone | 5 wt. % $Br_2$, 1.8 M $LiAlCl_4$ $SOCl_2$ | 3.80 | 17 | 30 |
| polyethylene oxide (600,000 M.W.) | 5 wt. % $Br_2$, 1.8 M $LiAlCl_4$ $SOCl_2$ | 3.83 | 370 | 13 |
| none | 5 wt. % $Br_2$, 1.8 M $LiAlCl_4$ $SOCl_2$ | 3.81 | 96 | 22 |
| polyethersulfone | 1.8 M $LiAlCl_4$ $SO_2Cl_2$ | 3.92 | 19 | 7 |
| polyethylene oxide (M.W. 600,000) | 1.8 M $LiAlCl_4$ $SO_2Cl_2$ | 3.92 | 422 | 61 |
| none | 1.8 M $LiAlCl_4$ $SO_2Cl_2$ | 3.90 | 71 | 890 |
| polyethersulfone | 5 wt. % $ICl_3$, 1.8 M $LiAlCl_4$ $SOCl_2$ | 3.91 | 38 | 101 |
| polyethylene oxide (M.W. 600,000) | 5 wt. % $ICl_3$, 1.8 M $LiAlCl_4$ $SOCl_2$ | 3.94 | 204 | 11 |
| none | 5 wt. % $ICl_3$, 1.8 M $LiAlCl_4$ $SOCl_2$ | 3.92 | 107 | 37 |

(*after 11 days at 37° C.)

What is claimed is:

1. A nonaqueous electrochemical cell comprising in operative relationship,
   a. a cathode current collector:
   b. an ionically conductive, liquid cathode-electrolyte solution; and
   c. a active metal anode, the anode having on its surface which contacts the cathode-electrolyte a polyether film.

2. An electrochemical cell according to claim 1 wherein the cathode current collector comprises porous carbon.

3. An electrochemical cell according to claim 1 wherein the cathode-electrolyte solution comprises a solute dissolved in a liquid active cathode depolarizer of an element of Group V or Group VI of the Periodic Table.

4. An electrochemical cell according to claim 3 wherein the solute is lithium aluminum chloride and the solvent is thionyl chloride.

5. An electrochemical cell according to claim 1 wherein the active metal anode is selected from the group consisting of lithium, Group IA, IIA, or III elements of the Periodic Table of the Periodic Table or alloys thereof.

6. An electrochemical cell according to claim 1 wherein the polyether film has a thickness in the range of about 0.0001 to 0.01 inch.

7. An electrochemical cell according to claim 1 wherein the polyether film is polyethylene oxide.

8. An electrochemical cell according to claim 1 wherein the polyether film is polyethersulfone.

9. An electrochemical cell according to claim 1 wherein the polyether film is a mixture of polyethersulfone and polyethylene oxide.

10. An nonaqueous electrochemical cell comprising in operative relationship,
   a. a cathode current collector:
   b. an ionically conductive, liquid cathode-electrolyte solution; and
   c. an active metal anode, the anode having on its surface which contacts the cathode-electrolyte a polyethersulfone film.

11. An electrochemical cell according to claim 10 wherein the cathode current collector comprises porous carbon.

12. An electrochemical cell according to claim 10 wherein the cathode-electrolyte solution comprises a solute dissolved in a liquid active cathode depolarizer of an element of Group V or Group VI of the Periodic Table.

13. An electrochemical cell according to claim 12 wherein the solute is lithium aluminum chloride and the solvent is thionyl chloride.

14. An electrochemical cell according to claim 10 wherein the active metal anode is selected from the group consisting of lithium, Groups IA, IIA, or III of the periodic table or alloys thereof.

15. An electrochemical cell according to claim 10 wherein the polyethersulfone film has a thickness in the range of about 0.0001 to 0.01 inch.

16. An electrochemical cell according to claim 10 wherein the polyethersulfone is of the structure:

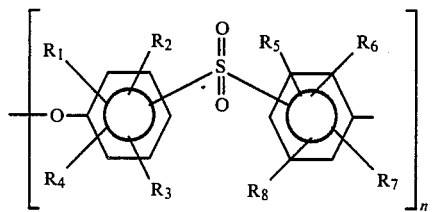

wherein $R_1$, $R_2$, $R_3$, $R_4$, $R_5$, $R_6$, $R_7$ and $R_8$ are separately and independently hydrogen, lower alkyl and "n" has a value in the range of about 10 to 1000.

17. An electrochemical cell according to claim 10 wherein the polyethersulfone is of the structure:

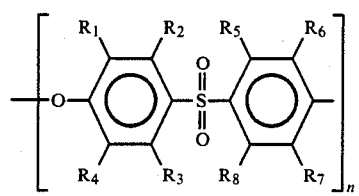

$R_1$–$R_8$ are separately and independently hydrogen or lower alkyl and wherein "n" has a value in the range of about 10 to 1000.

18. An electrochemical cell according to claim 17 wherein $R_1$–$R_8$ are all hydrogen.

19. A nonaqueous electrochemical cell comprising in operative relationship,
   a. A cathode current collector;
   b. an ionically conductive, liquid cathode-electrolyte solution comprising a solute dissolved in a liquid active cathode depolarizer of an element of Group V or Group VI of the Periodic Table; and
   c. an active metal anode, the anode having on its surface which contacts the cathode-electrolyte an adherence, ionically permeable polyethersulfone film of the structure:

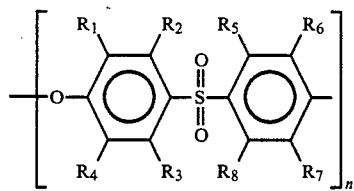

wherein $R_1$–$R_8$ are separately and independently hydrogen or lower alkyl, and "n" has a value in the range of about 10 to 1,000.

20. An electrochemical cell according to claim 19 wherein the active cathode depolarizer is thionyl chloride.

21. An electrochemical cell according to claim 20 wherein the active metal anode is lithium.

22. An electrochemical cell according to claim 20 wherein the solute is LiAlCl$_4$.

23. An electrochemical cell according to claim 20 wherein the polyethersulfone film has a thickness in the range of about 0.0001 to 0.01 inch.

* * * * *